(12) United States Patent
Fragiacomo et al.

(10) Patent No.: US 9,820,343 B1
(45) Date of Patent: Nov. 14, 2017

(54) LIGHT-EMITTING DIODE HEADLIGHT DRIVER

(71) Applicant: Infineon Technologies AG, Neubiberg (DE)

(72) Inventors: Fabio Fragiacomo, Montegrotto Terme (IT); Maurizio Galvano, Padua (IT); Hardy Stoelben, Villach (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/219,150

(22) Filed: Jul. 25, 2016

(51) Int. Cl.
*H05B 33/08* (2006.01)
*B60Q 1/04* (2006.01)

(52) U.S. Cl.
CPC .......... *H05B 33/0809* (2013.01); *B60Q 1/04* (2013.01); *H05B 33/0815* (2013.01)

(58) Field of Classification Search
CPC ... B60Q 1/04; H05B 33/0809; H05B 33/0815
See application file for complete search history.

(56) References Cited

U.S. PATENT DOCUMENTS

| | | | |
|---|---|---|---|
| 6,370,051 B1 | 4/2002 | Patel | |
| 6,864,641 B2 | 3/2005 | Dygert | |
| 7,911,193 B2 | 3/2011 | Galvano et al. | |
| 8,283,870 B2 * | 10/2012 | Ger | H05B 33/0824 315/125 |
| 8,773,038 B2 | 7/2014 | Logiudice | |
| 8,791,645 B2 * | 7/2014 | Saccomanno | G09G 3/3406 315/159 |
| 9,203,311 B2 | 12/2015 | Penzo et al. | |
| 2006/0231745 A1 | 10/2006 | Bodano et al. | |
| 2008/0191642 A1 * | 8/2008 | Slot | H05B 33/0818 315/295 |
| 2009/0072764 A1 * | 3/2009 | Kitagawa | H05B 33/0845 315/320 |
| 2009/0218960 A1 | 9/2009 | Lyons et al. | |
| 2010/0026203 A1 * | 2/2010 | Zhao | H05B 33/0815 315/291 |
| 2010/0079323 A1 | 4/2010 | Miao | |
| 2010/0109557 A1 * | 5/2010 | Bouchard | H05B 33/0818 315/294 |
| 2014/0159593 A1 * | 6/2014 | Chu | H05B 33/0824 315/191 |

(Continued)

*Primary Examiner* — Alexander H Taningco
*Assistant Examiner* — Kurtis R Bahr
(74) *Attorney, Agent, or Firm* — Shumaker & Sieffertm P.A.

(57) ABSTRACT

A driver circuit for light-emitting diode (LED) headlight system includes a buck-boost converter connected in series to a first plurality of branches of LEDs. Each of the plurality of branches of LEDs includes a bypass switch configured to bypass the corresponding branch of LEDs. The buck-boost converter provides a constant current with an adjustable voltage to a selectable portion of the plurality of branches of LEDs, while bypassing each of the other branches of LEDs via the corresponding bypass switches. In some examples, the circuit delivers the current to the selectable portion of the first plurality of branches of LEDs during a first portion of a duty cycle, while delivering a digitally modulated current to a second plurality of branches during a second portion of the duty cycle.

21 Claims, 6 Drawing Sheets

(56) References Cited

U.S. PATENT DOCUMENTS

| | | | |
|---|---|---|---|
| 2014/0217909 A1* | 8/2014 | Chu | H05B 33/0827 |
| | | | 315/192 |
| 2015/0102723 A1 | 4/2015 | Krick et al. | |
| 2015/0256071 A1* | 9/2015 | Penzo | H02M 3/1582 |
| | | | 315/297 |
| 2016/0227616 A1* | 8/2016 | Lee | H05B 33/0815 |
| 2017/0048935 A1* | 2/2017 | Koo | H05B 33/089 |

\* cited by examiner

LIGHT-EMITTING DIODE HEADLIGHT DRIVER

TECHNICAL FIELD

This disclosure generally relates to techniques for power conversion in a light-emitting diode (LED) driver circuit in an LED headlight system.

BACKGROUND

DC/DC converters, including buck-boost converters, may be used as drivers for loads with specific current and/or voltage requirements, such as chains of light-emitting diodes (LEDs). The light intensity of an LED chain is controlled by the amount of current flowing through it. Generally, a closed loop current generator may be used to keep the current constant. For lighting with a high current load, switched-mode controllers may be used. In applications that demand high efficiency and high flexibility, such as in some automotive lighting applications, a synchronous buck-boost DC/DC converter topology may be used.

Some applications in automotive lighting or other applications involve a single LED chain made up of a number of LEDs. The number may vary depending on the specific application. One or more of the LEDs can be bypassed at times, temporarily reducing the length of the LED chain. A DC/DC converter may control the current flowing through the LED chain as different numbers of the LEDs in the chain are used, while the output voltage is set by the number and the forward voltage of the LEDs that compose the chain.

SUMMARY

Techniques are disclosed for an improved driver circuit for a light-emitting diode (LED) headlight system that uses a buck-boost converter with an active output voltage discharge. LEDs are often used in vehicle headlight systems. These headlight systems typically include multiple settings for the illumination provided by the system. For example, an automobile headlight system often has settings for high beams, low beams, corner lights, daytime running lights (DRL), and positioning lights. Other types of vehicles may have other types of configurations as well. In an LED headlight system, each type of illumination is provided by a separate branch of a plurality of LEDs. For example, a first branch of LEDs operating at 16 Volts (V) and 1.4 Amps (A) provides high-beam functionality, while a second branch of LEDs operating at 20 V and 1.4 A provides low-beam functionality, a third branch of LEDs operating at 50 V and 200 mA provides DRL functionality, and so on.

Because each branch of LEDs may operate at different voltages and amperages, a driver circuit is used to transform input power into power suitable for the currently-used branch of LEDs. In some applications, a switch-based power converter (hereafter referred to as a "power converter" or simply a "converter") may receive a power input and convert (e.g., by stepping-up or stepping-down) the power input to a power output that has a voltage or current level that is different (e.g., regulated) than the voltage or current level of the power input, for instance, to provide the power output to a filter for powering a load (e.g., a device). As described herein, the term "step-up" refers to a power converter configured to receive an input power signal with a first voltage level, and output a power signal with a second voltage level that is greater than the first voltage level. As also described herein, the term "step-down" converter refers to a power converter configured to receive an input power signal with a first voltage level, and output a power signal with a second voltage level that is less than the first voltage level.

In either case, a power converter may have one or more switches (e.g., MOS power switch transistors based switches, gallium nitride (GaN) based switches, or other types of switch devices) arranged in a power stage configuration (e.g., a single period, or multi-period half-bridge configuration, etc.) that the power converter controls, according to one or more modulation techniques, to change the current or voltage level of the power output. A single period half-bridge may include a high-side switch coupled to a low-side switch at a switching node whereas a multi-period half-bridge may include multiple high-side switches coupled to multiple low-side switches at a switching node.

A power converter may include one or more gate drivers and control logic to control (e.g., turn-on and turn-off) the one or more switches of the power stage using modulation techniques. Such modulation of the switches of a power stage may operate according to pulse-density-modulation (PDM), pulse-width-modulation (PWM), pulse-frequency modulation (PFM), or another suitable modulation technique. By controlling the switches of a power stage using modulation techniques, a power converter can regulate the current or voltage level of the power being outputted by the power converter.

In one example of a driver circuit for an LED headlight system, a boost converter provides a first stage of power transformation. A separate buck converter is paired with each branch of LEDs to perform a second stage of power transformation. This implementation is expensive because it requires a separate buck converter, and thus a separate power inductor, for each branch of LEDs. Further, because each converter performs power conversion at approximately 90% efficiency, and because two stages of converters are used, the circuit performs power conversion inefficiently (90%*90%=81%).

An another example of a driver circuit for an LED headlight system uses a single boost converter in series with a single buck converter. In this configuration, each branch of LEDs is in parallel with the output of the boost-buck converter, such that only a single buck converter is required. While this circuit is less expensive than the first, it has the disadvantage of only being able to power a single branch of the LEDs at any time. Further, because the boost and buck converters remain in series, this circuit also suffers from low efficiency.

According to the techniques of the disclosure, a driver circuit is described that is lower in cost, more efficient, and more flexible than other driver circuits. In one example, the driver circuit of the present disclosure uses only a single buck-boost converter connected in series to a plurality of branches of LEDs. Each of the plurality of branches of LEDs implements a different headlight function and requires a different voltage to operate. For example, one branch of LEDs may operate as high-beams, low-beams, or corner lights of a vehicle. Further, each of the plurality of branches of LEDs includes a bypass circuit configured to bypass the corresponding branch of LEDs. The buck-boost converter provides, to the plurality of branches of LEDs, a constant output current having an adjustable voltage to the plurality of branches of LEDs. The buck-boost converter delivers current to a selectable portion of the plurality of branches of LEDs, while bypassing each of the other branches of LEDs via the corresponding bypass switches.

In some examples, the system further includes a digital modulation circuit 210 for digitally modulating the output of the buck-boost converter to deliver a digitally modulated current to a branch of LEDs configured to operate as at least one of DRL or positioning lights. In this example, the system delivers a current to the selectable portion of the plurality of branches of LEDs during a first portion of a duty cycle, while delivering the digitally modulated current during a second portion of the duty cycle.

The driver circuit set forth in this disclosure may be suitable for any type of vehicle, for example, automobiles, such as cars, trucks, and sport utility vehicles (SUV), watercraft and ships, aircraft, military vehicles, such as tanks, jeeps, and half-tracks, amphibious vehicles, transportation vehicles, such as semi-trucks and trailers, construction vehicles, such as bulldozers, tractors, backhoes, and cranes, heavy machinery, trains, motorcycles, mopeds, recreational vehicles such as golf carts, dune buggies, and all-terrain vehicles (ATV), unpowered vehicles, such as bicycles, and many other types of vehicles not explicitly described herein.

Accordingly, the driver circuit of the present disclosure is more efficient than other driver circuits because it uses only a single buck-boost converter. Further, the driver circuit described herein is less expensive than other driver circuits because it uses only a single power inductor to perform power transformation. Further, the driver circuit described herein is more flexible in operation because it may selectively activate one or more of the branches of LEDs such that any combination of the branches may be activated at any given time.

In one example, this disclosure describes a method including: receiving, by a light-emitting diode (LED) driver circuit, a first selection of a first set of a plurality of branches of LEDs, wherein each of the plurality of branches is configured to be connected in series to one another and to a buck-boost converter, and wherein the buck-boost converter is configured to output a constant current at an adjustable output voltage; in response to receiving the first selection: selecting, by the LED driver circuit and via a plurality of bypass switches, the first set of the plurality of branches of LEDs corresponding to the first selection; providing, by the LED driver circuit, the constant current to the first set of the plurality of branches of LEDs; receiving, by the LED driver circuit, a second selection of a second set of the plurality of branches of LEDs, wherein the second selection includes at least one branch of the plurality of branches of LEDs that is not in the first selection; and in response to receiving the second selection: selecting, by the LED driver circuit and via the plurality of bypass switches, the second set of the plurality of branches of LEDs corresponding to the second selection; and providing, by the LED driver circuit, the constant current to the second set of the plurality of branches of LEDs.

In another example, this disclosure describes a light-emitting diode (LED) driver circuit, configured to: receive a first selection of a first set of a plurality of branches of LEDs, wherein each of the plurality of branches is configured to be connected in series to one another and to a buck-boost converter, and wherein the buck-boost converter is configured to output a constant current at an adjustable output voltage; in response to receiving the first selection: select, via a plurality of bypass switches, the first set of the plurality of branches of LEDs corresponding to the first selection; provide the constant current to the first set of the plurality of branches of LEDs; receive a second selection of a second set of the plurality of branches of LEDs, wherein the second selection includes at least one branch of the plurality of branches of LEDs that is not in the first selection; and in response to receiving the second selection: select, via the plurality of bypass switches, the second set of the plurality of branches of LEDs corresponding to the second selection; and provide the constant current to the second set of the plurality of branches of LEDs.

In another example, this disclosure describes a system including: a buck-boost converter configured to output a constant current at an adjustable output voltage; a light-emitting diode (LED) driver circuit, configured to: receive a first selection of a first set of a plurality of branches of LEDs, wherein each of the plurality of branches is configured to be connected in series to one another and to the buck-boost converter; in response to receiving the first selection: select, via a plurality of bypass switches, the first set of the plurality of branches of LEDs corresponding to the first selection; provide the constant current to the first set of the plurality of branches of LEDs; receive a second selection of a second set of the plurality of branches of LEDs, wherein the second selection includes at least one branch of the plurality of branches of LEDs that is not in the first selection; and in response to receiving the second selection: select, via the plurality of bypass switches, the second set of the plurality of branches of LEDs corresponding to the second selection; and provide the constant current to the second set of the plurality of branches of LEDs; and the plurality of branches of LEDs.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
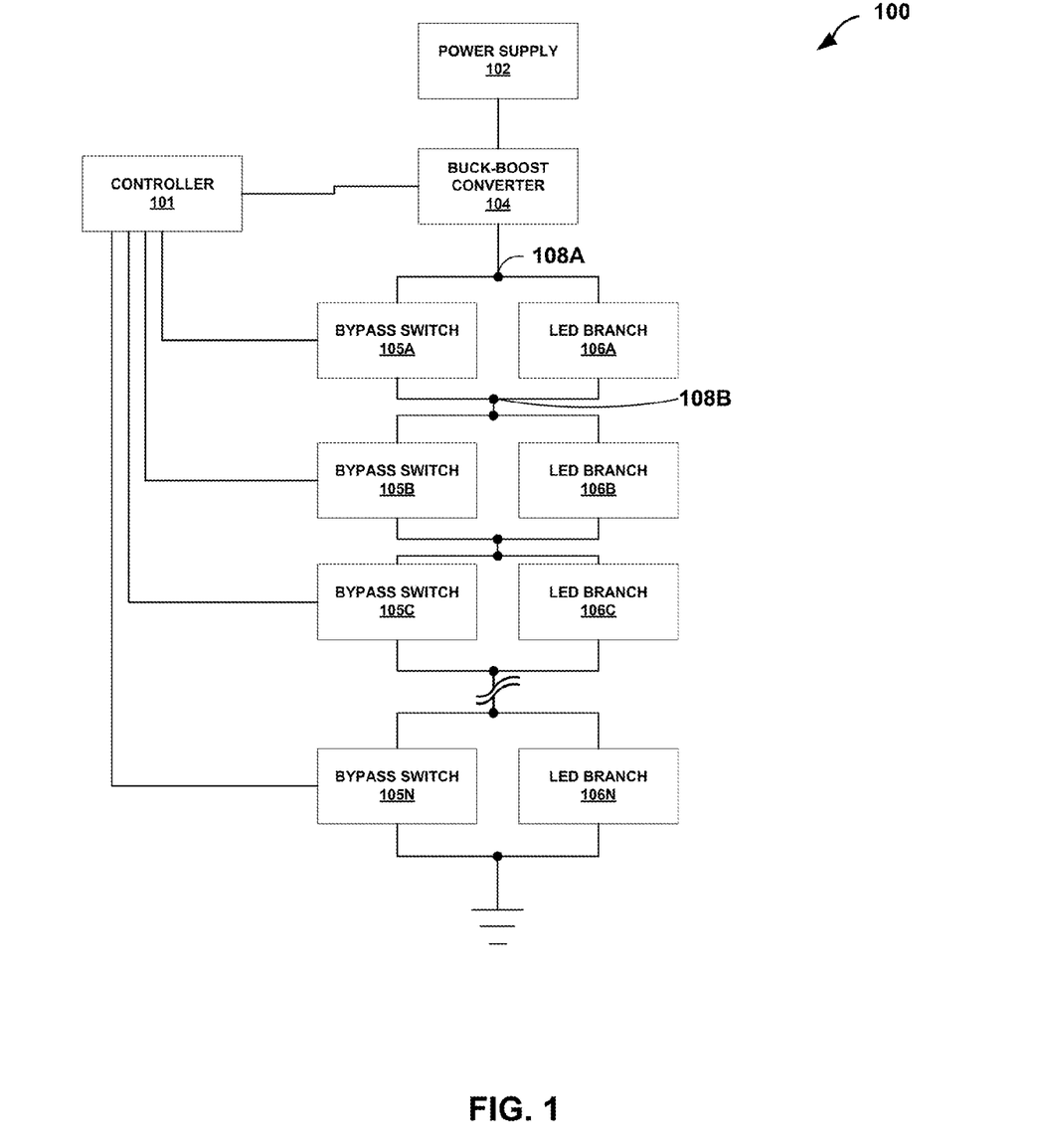
FIG. 1 is a block diagram of a driver circuit using a buck-boost converter with an active output voltage discharge for an LED headlight system according to the techniques of the disclosure.

FIG. 1 is a block diagram of a driver circuit 100 using a buck-boost converter 104 with an active output voltage discharge for an LED headlight system according to the techniques of the disclosure. As depicted in FIG. 1, the driver circuit 100 includes a power supply 102, a buck-boost converter 104, a controller 101, a plurality of LED branches 106A-106N (collectively, "LED branches 106") and a plurality of bypass switches 105A-105N (collectively, "bypass switches 105") paired with each of LED branches 106.

Power supply 102 provides unregulated electrical power to the driver circuit 100. In some examples, power supply 102 is a vehicle battery, such as an Alkaline, Zinc-Carbon, Lead-Acid, Mercury, Lithium Ion, Lithium Polymer, Silver Oxide, Nickel-Cadmium, Nickel-Metal Hydride, or Nickel-Zinc battery. In some examples, power supply 102 is a combustion engine that operates by combusting a fuel, such as gasoline, kerosene, diesel, bio-diesel, biofuel, WA, alcohol, propane, or liquid natural gas (LNG). In such an example, the engine is connected to an alternator to create electrical current for use driver circuit 100.

Buck-boost converter 104 is a current mode controlled synchronous buck-boost converter with fast, active output voltage discharge. In various examples, synchronous buck-boost converter 104 inverts the direction of the current flowing through its inductor, such that current flows from its output capacitor to ground through the inductor and output resistor. By using an inverted current through the inductor, buck-boost converter 104 actively discharges an output capacitor until a desired new value of voltage is reached at the output, before bypassing a first branch of LEDs 106A. The desired new value of voltage, or second output voltage, reached at the output corresponds to the altered output voltage requirement of a second branch of LEDs 106B. Thus, buck-boost converter 104 with active output voltage discharge may be contrasted with other types of buck-boost converters that merely allow the output voltage to discharge passively before bypassing a portion of the load. In some examples, the buck-boost converter 104 is a DC-DC converter configured to deliver a constant current to the output of the buck-boost converter. Further, the buck-boost converter 104 is configured to adjust the voltage on the output to discharge an output capacitor of the buck-boost converter 104 to a desired output voltage to avoid the current spikes incurred by other buck-boost converters when rapidly switching output voltage.

A buck-boost converter 104 as described herein may avoid such problems as the potential for current overshoot, the potential to exceed the maximum current an LED can withstand, the potential for dimming of the LED chain, and the potential destruction of the LEDs, among other potential examples. For example, instead of discharging output capacitor voltage through either the complete LED branches 106 or a subset of the LEDs in LED branches 106, buck-boost converter 104 may instead apply an active discharge, or a fast discharge, of the output voltage from the voltage output through an inductor of buck-boost converter 104 to ground. This active discharge of voltage may be significantly faster than a passive discharge of voltage through either the complete or shortened LED chain. Buck-boost converter 104 may receive an indication of an altered output voltage requirement from controller 101, such as for a reduced number of LEDs, and in response, deactivate a current control loop or voltage control loop, and apply the active discharge. Once the active discharge is completed, buck-boost converter 104 may resume a forward current through its inductor to its output while an output capacitor of the buck-boost capacitor is at the second output voltage, and reactivate a current control loop or voltage control loop to apply the selected output current at the output while the output capacitor is at the second output voltage.

Example techniques for a buck-boost converter having such an active output discharge are described in U.S. patent application Ser. No. 14/199,633 by Penzo, et al., entitled, "BUCK-BOOST CONVERTER WITH ACTIVE OUTPUT VOLTAGE DISCHARGE," which was filed on Mar. 6, 2014 and issued as U.S. Pat. No. 9,203,311 on Dec. 1, 2015, which is incorporated herein by reference in its entirety.

In some examples, each of LED branches 106 comprise of one or more LEDs that perform a specific vehicle headlight function. For example, LED branch 106A comprises a string of LEDs operating at 16 V and 1.4 A to provide low-beam functionality for a vehicle. In another example, LED branch 106B comprises a string of LEDs operating at 20V and 1.4 A to provide high-beam functionality for the vehicle. In another example, LED branch 106C comprises a string of LEDs operating at 16 V and 1.4 A to provide corner-light functionality for a vehicle. In the example of FIG. 1, LED branches 106 comprise a number "N" of branches of LEDs, wherein N represents any number. In some examples, a vehicle may have less, more, or different configurations of LED branches 106 that comprise the vehicle headlight configuration for that particular vehicle.

In some examples, the one or more LEDs that comprise each of LED branches 106 are connected in series with the other LEDs of the same LED branch 106. In other examples, the one or more LEDs that comprise each of LED branches 106 are connected in parallel with the other LEDs of the same LED branch 106 or in some combination of series and parallel configurations. Each of the one or more LEDs of LED branches 106 may be any sort of LED, such as organic LEDs (OLEDs), phosphor-based LEDs, Quantum Dot LEDs (QD-LEDs), miniature LEDs, low-current LEDs, ultra-high output LEDs, high-power LEDs, multi-color LEDs, or filament LEDs. In some examples, LED 16 is a single LED. In other examples, LEDs 16 are a string of LEDs, a group of strings of LEDs, or an array of LEDs.

Bypass switches 105 are a switches that, when activated, cause current flowing from buck-boost converter 104 to circumvent the corresponding LED branch 106. For example, bypass switch 105A is electrically connected in parallel to LED branch 106A. When bypass switch 105A is open, no current may flow from node 206A through bypass switch 105A to node 206B. Therefore, current from buck-boost converter 104 flows through LED branch 106A. When bypass switch 105A is closed, an electrical short circuit is formed between nodes 206A, through bypass switch 105A to node 206B. Therefore, bypass circuit 105A prevents any current from buck-boost converter 104 from flowing through LED branch 106A. In some examples, bypass switches 105 are transistors, such as metal-oxide semiconductor field-effect transistors (MOSFETs), bipolar junction transistors (BJTs). In some examples, bypass switches 105 are power MOSFETs. In other examples, bypass switches 105 are mechanical switches or electrical circuits configured to perform switching functions across different voltage domains, such as level shifter circuits or LLC resonant half-bridge converter circuits.

Controller 101 is configured to selectively activate one or more of bypass switches 105. In some examples, controller 101 is implemented as one or more wired Boolean OR logic gates. In some examples, controller 101 is one or more microprocessors, digital signal processors (DSPs), application specific integrated circuits (ASICs), field programmable gate arrays (FPGAs), or any other equivalent integrated or discrete logic circuitry, as well as any combinations of such components. In some examples, controller 101 includes a memory, which may be random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. Further, this memory may be implanted entirely in hardware, software, or a combination thereof.

According to the techniques of the disclosure, controller 101, via the concomitant bypass switches 105, selectively enables one or more of LED branches 106 while selectively disabling the LED branches 106 not in use. Furthermore, buck-boost converter 104 supplies a constant current to LED branches 106. Buck-boost converter 104, in response to instructions from controller 101, adjusts the output voltage to supply sufficient voltage to the selected one or more LED branches 106. Because buck-boost converter 104 provides a constant current, but may rapidly vary its output voltage by means of its active output discharge, buck-boost converter 104 is able to respond to changes in the selected number of LED branches 106. Accordingly, buck-boost converter 104 may avoid such problems as the potential for current overshoot, the potential to exceed the maximum current an LED can withstand, the potential for dimming of the LED chain, and the potential destruction of the LEDs caused by using a buck-boost converter without an active output discharge.

As an example, LED branch 106A comprises a string of LEDs operating at 16 V and 1.4 A to provide low-beam functionality for a vehicle, LED branch 106B comprises a string of LEDs operating at 20V and 1.4 A to provide high-beam functionality for the vehicle, and LED branch 106C comprises a string of LEDs operating at 16 V and 1.4 A to provide corner-light functionality for a vehicle. Controller 101 enables LED branch 106A via bypass switch 105A while disabling LED branches 106B-106C. Controller 101 further provides control signals to buck-boost converter 104 such that buck-boost converter 104 outputs sufficient voltage to drive LED branch 106A, i.e. 16 V. Subsequently, controller 101 disables LED branch 106A via bypass switch 105A while enabling LED branches 106B-106C. Controller 101 further provides control signals to buck-boost converter 104 such that buck-boost converter 104 outputs sufficient voltage to drive LED branches 106B-106C, i.e. 36 V.

Accordingly, the driver circuit of the present disclosure is more efficient than other driver circuits because it uses only a single buck-boost converter. Further, the driver circuit described herein is less expensive than other driver circuits because it uses only a single power inductor to perform power transformation. Further, the driver circuit described herein is more flexible in operation because it may selectively activate one or more of the branches of LEDs such that any combination of the branches may be activated at any given time.

The architecture of driver circuit 100 illustrated in FIG. 1 is shown as an example. The techniques as set forth in this disclosure may be implemented in the example driver circuit 100 of FIG. 1, as well as other types of driver circuits not described specifically herein. Nothing in this disclosure should be construed so as to limit the techniques of this disclosure to the example architecture illustrated by FIG. 1.

Figure 2:
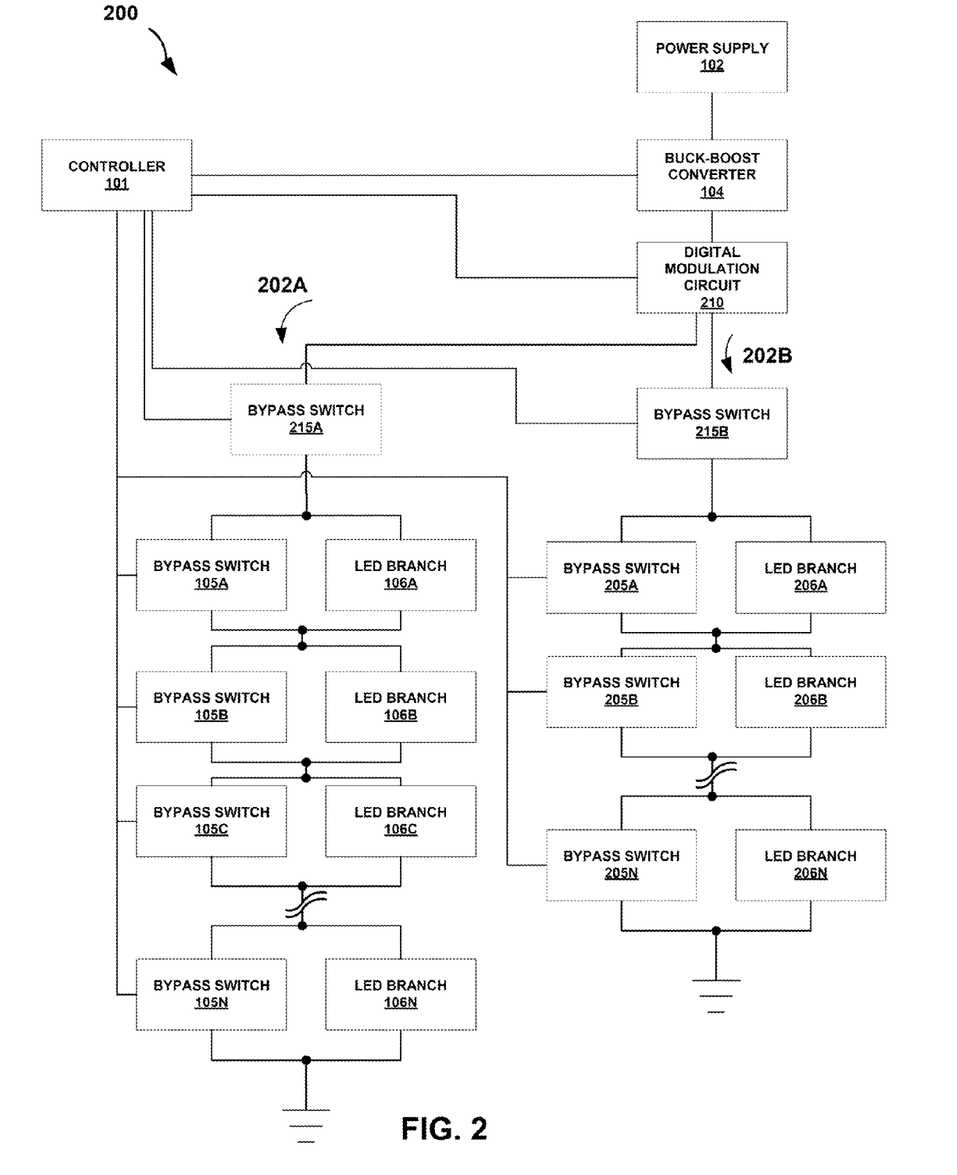
FIG. 2 is a block diagram of a driver circuit using a buck-boost converter with an active output voltage discharge for an LED headlight system according to the techniques of the disclosure.

FIG. 2 is a block diagram of a driver circuit 200 using a buck-boost converter with an active output voltage discharge for an LED headlight system according to the techniques of the disclosure. The example driver circuit 200 of FIG. 2 functions in a similar fashion to the driver circuit 100 of FIG. 1. As depicted in FIG. 2, driver circuit 200 includes a power supply 102, a buck-boost converter 104, a controller 101, a plurality of LED branches 106A-106N (collectively, "LED branches 106") and a plurality of bypass switches 105A-105N (collectively, "bypass switches 105") paired with each of LED branches 106.

In the example of FIG. 2, driver circuit 200 further includes a digital modulation circuit 210 for digitally modulating the output of the buck-boost converter to deliver a first digitally modulated current 202A to the first plurality of LED branches 106 and a second digitally modulated current 202B second plurality of LED branches 206A-206N (collectively, LED branches 206). In some examples, LED branches 206 are low-current lighting systems. In some examples, digital modulation circuit 210 digitally modulates the output current of buck-boost converter 104 according to one of digital pulse-width modulation, digital pulse-density modulation, and digital pulse-duration modulation.

In some examples, each of LED branches 206 comprise of one or more LEDs that perform a specific vehicle headlight function. For example, LED branch 206A comprises a string of LEDs operating at 50 V and 200 mA to provide DRL functionality for a vehicle. In another example, LED branch 206B comprises a string of LEDs operating at 50 V and 200 mA to provide positioning light functionality for the vehicle. In the example of FIG. 2, LED branches 206 comprise a number "N" of branches of LEDs, wherein N represents any number. In some examples, a vehicle may have less, more, or different configurations of LED branches 206 that comprise the vehicle headlight configuration for that particular vehicle.

In some examples, the one or more LEDs that comprise each of LED branches 206 are connected in series with the other LEDs of the same LED branch 206. In other examples, the one or more LEDs that comprise each of LED branches 206 are connected in parallel with the other LEDs of the same LED branch 206 or in some combination of series and parallel configurations. Each of the one or more LEDs of LED branches 206 may be any sort of LED, such as organic LEDs (OLEDs), phosphor-based LEDs, Quantum Dot LEDs (QD-LEDs), miniature LEDs, low-current LEDs, ultra-high output LEDs, high-power LEDs, multi-color LEDs, or filament LEDs. In some examples, LED 16 is a single LED. In other examples, LEDs 16 are a string of LEDs, a group of strings of LEDs, or an array of LEDs.

In the example of FIG. 1 above, each branch of LED branches 106 operate at different voltages, but required the same amount of current (e.g., 1.4 A). Thus, buck-boost converter 104 may provide a constant current and alter only the output voltage to selectively enable one or more LED branches 106. However, in some examples, certain functions of the vehicle headlight system may require much lower currents. For example, DRL or positioning lights may require very small current values in comparison to high-beam lights.

In the example of FIG. 2, controller 101 issues instructions to buck-boost converter 104 such that buck-boost converter 104 delivers a constant output current to digital modulation circuit 210 according to a 2-period duty cycle. During each period of the cycle, digital modulation circuit 210 converts the output current of buck-boost converter 104 into a digitally modulated current suitable for driving one branch of the plurality of branches of LEDs, e.g., one of LED branches 106 and LED branches 206. Controller 101 selects the appropriate one of LED branches 106 and LED branches 206 via branch bypass switches 215A-215B.

For example, during the first period of the duty cycle, digital modulation circuit 210 converts, according to a digital duty cycle, the constant output current to the first digitally modulated current 202A and delivers the first digitally modulated current 202A to the first plurality of LED branches 106. During the second period of the duty cycle, digital modulation circuit 210 converts, according to a digital duty cycle, the constant output current to the second digitally modulated current 202B and delivers the second digitally modulated current 202B to the second plurality of LED branches 206. The period of the duty cycle is selected such that the switching frequency is invisible to the human eye (e.g., greater than 60 Hertz (Hz)). During each period of the duty cycle, LED branches 106, bypass switches 105, LED branches 206, and bypass switches 205 operate in a substantially similar fashion to LED branches 106 and bypass switches 105 of FIG. 1.

During the first period of the duty cycle, controller 101 selectively enables the plurality of LED branches 106 via bypass switch 215, while selectively disabling the plurality of LED branches 206 via bypass switch 216. Further, controller 101, via the concomitant bypass switches 105, selectively enables one or more of LED branches 106. Buck-boost converter 104 outputs a constant current to digital modulation circuit 210. Buck-boost converter 104, in response to instructions from controller 101, adjusts the output voltage to supply sufficient voltage to the selected one or more LED branches 106. Digital modulation circuit 210 receives the constant current from buck-boost converter 104 and digitally modulates the current to deliver a first digitally modulated current 202A to LED branches 106. The modulated current has a peak current amplitude equal to the amplitude of the constant current of the buck-boost converter 104, and an average current such that LED branches 106 receive the proper power for operation without damage or undercurrent. Furthermore, because buck-boost converter 104 provides a constant current, but may rapidly vary its output voltage by means of its active output discharge, buck-boost converter 104 is able to respond to changes in the selected number of LED branches 106 during this first portion of the duty cycle. Accordingly, buck-boost converter 104 may avoid such problems as the potential for current overshoot, the potential to exceed the maximum current an LED can withstand, the potential for dimming of the LED chain, and the potential destruction of the LEDs caused by using a buck-boost converter without an active output discharge.

During the second period of the duty cycle, controller 101 selectively disables the plurality of LED branches 106 via bypass switch 215, while selectively enabling the plurality of LED branches 206 via bypass switch 216. Further, controller 101, via the concomitant bypass switches 205, selectively enables one or more of LED branches 206. Buck-boost converter 104 outputs a constant current to digital modulation circuit 210. Buck-boost converter 104, in response to instructions from controller 101, adjusts the output voltage to supply sufficient voltage to the selected one or more LED branches 206. Digital modulation circuit 210 receives the constant current from buck-boost converter 104 and digitally modulates the current to deliver a second digitally modulated current 202B to LED branches 206. The modulated current has a peak current amplitude equal to the amplitude of the constant current of the buck-boost converter 104, but a much lower average current such that low-current lighting systems, such as LED branches 206, function without damage. Furthermore, because buck-boost converter 104 provides a constant current, but may rapidly vary its output voltage by means of its active output discharge, buck-boost converter 104 is able to respond to changes in the selected number of LED branches 106 during this first portion of the duty cycle. Accordingly, buck-boost converter 104 may avoid such problems as the potential for current overshoot, the potential to exceed the maximum current an LED can withstand, the potential for dimming of the LED chain, and the potential destruction of the LEDs caused by using a buck-boost converter without an active output discharge.

As an example, LED branch 106A comprises a string of LEDs operating at 16 V and 1.4 A to provide low-beam functionality for a vehicle, LED branch 106B comprises a string of LEDs operating at 20V and 1.4 A to provide high-beam functionality for the vehicle, and LED branch 106C comprises a string of LEDs operating at 16 V and 1.4 A to provide corner-light functionality for a vehicle. Similarly, LED branch 206A comprises a string of LEDs operating at 50 V and 200 mA to provide DRL functionality for a vehicle, and LED branch 206B comprises a string of LEDs operating at 50 V and 200 mA to provide positioning light functionality for a vehicle.

During a first period of the duty cycle, controller 101 enables LED branches 106 via bypass switch 215A, while disabling LEDs 206 via bypass switch 215B. Further controller 101 enables LED branch 106A via bypass switch 105A while disabling LED branches 106B-106C. Controller 101 further provides control signals to buck-boost converter 104 such that buck-boost converter 104 outputs sufficient voltage to drive LED branch 106A, i.e. 16 V. Subsequently, controller 101 disables LED branch 106A via bypass switch 105A while enabling LED branches 106B-106C. Controller 101 further provides control signals to buck-boost converter 104 such that buck-boost converter 104 outputs sufficient voltage to drive LED branches 106B-106C, i.e. 36 V. During this period, digital modulation circuit 210 converts the output current from buck-boost converter 104 into a first digitally modulated current 202A sufficient to drive the selected LEDs 106.

During a second period of the duty cycle, controller 101 disables LED branches 106 via bypass switch 215A, while enabling LEDs 206 via bypass switch 215B. Further, controller 101 enables LED branch 206A via bypass switch 205A while disabling LED branch 206B. Controller 101 further provides control signals to buck-boost converter 104 such that buck-boost converter 104 outputs sufficient voltage to drive LED branch 206A, i.e. 50 V. Subsequently, controller 101 enables both LED branches 206A and 206B via bypass switches 205A and 205B. Controller 101 further provides control signals to buck-boost converter 104 such that buck-boost converter 104 outputs sufficient voltage to drive LED branches 206B-206C, i.e. 100 V. During this period, digital modulation circuit 210 converts the output current from buck-boost converter 104 into a second digitally modulated current 202B sufficient to drive the selected LEDs 206.

In some examples, driver circuit 200 operates in the first period of the duty cycle and does not enter the second period when only one or more LED branches 106 are enabled and none of LED branches 206 are selected. Similarly, driver circuit 200 operates in the second period and does not enter the first period when only one or more LED branches 206 are enabled and none of LED branches 106 are selected. In this example, while at least one LED branch 106 and at least one LED branch 206 are selected and enabled, driver circuit 200 switches between the first period and the second period of the duty cycle according to a predetermined period of operation.

Accordingly, the driver circuit of the present disclosure is more efficient than other driver circuits because it uses only a single buck-boost converter. Further, the driver circuit described herein is less expensive than other driver circuits because it uses only a single power inductor to perform power transformation. Further, the driver circuit described herein is more flexible in operation because it may selectively activate multiple groups of LED branches having different current requirements such that any combination of branches may be activated at any given time, with the switching occurring without being visible to the operator of the vehicle.

The architecture of driver circuit 200 illustrated in FIG. 2 is shown as an example. The techniques as set forth in this disclosure may be implemented in the example driver circuit 200 of FIG. 2, as well as other types of driver circuits not described specifically herein. Nothing in this disclosure should be construed so as to limit the techniques of this disclosure to the example architecture illustrated by FIG. 2.

Figure 3:
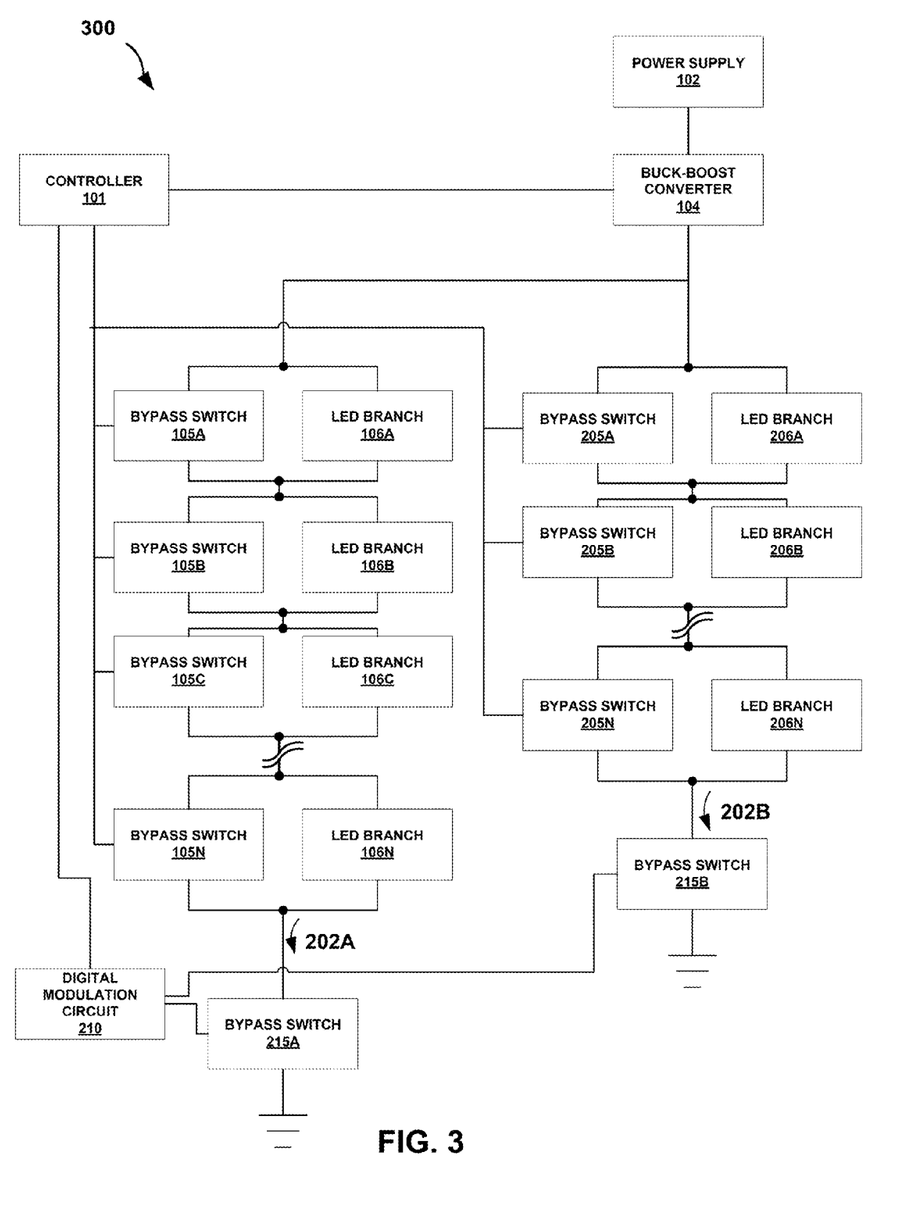
FIG. 3 is a block diagram of a driver circuit using a buck-boost converter with an active output voltage discharge for an LED headlight system according to the techniques of the disclosure.

FIG. 3 is a block diagram of a driver circuit 300 using a buck-boost converter with an active output voltage discharge for an LED headlight system according to the techniques of the disclosure. With respect to FIG. 2, bypass switches 215A-215B and digital modulation circuit 210 are implemented on the high-side of the plurality of LED branches 106 and 206. However, the example driver circuit 300 of FIG. 3 provides an example implementation wherein bypass switches 215A-215B and digital modulation circuit 210 are implemented on the low-side of the plurality of LED branches 106 and 206. Otherwise, the operation of driver circuit 300 of FIG. 3 is substantially similar to the operation of driver circuit 200 of FIG. 2.

The architecture of driver circuit 300 illustrated in FIG. 3 is shown as an example. The techniques as set forth in this disclosure may be implemented in the example driver circuit 300 of FIG. 3, as well as other types of driver circuits not described specifically herein. Nothing in this disclosure should be construed so as to limit the techniques of this disclosure to the example architecture illustrated by FIG. 3.

Figure 4:
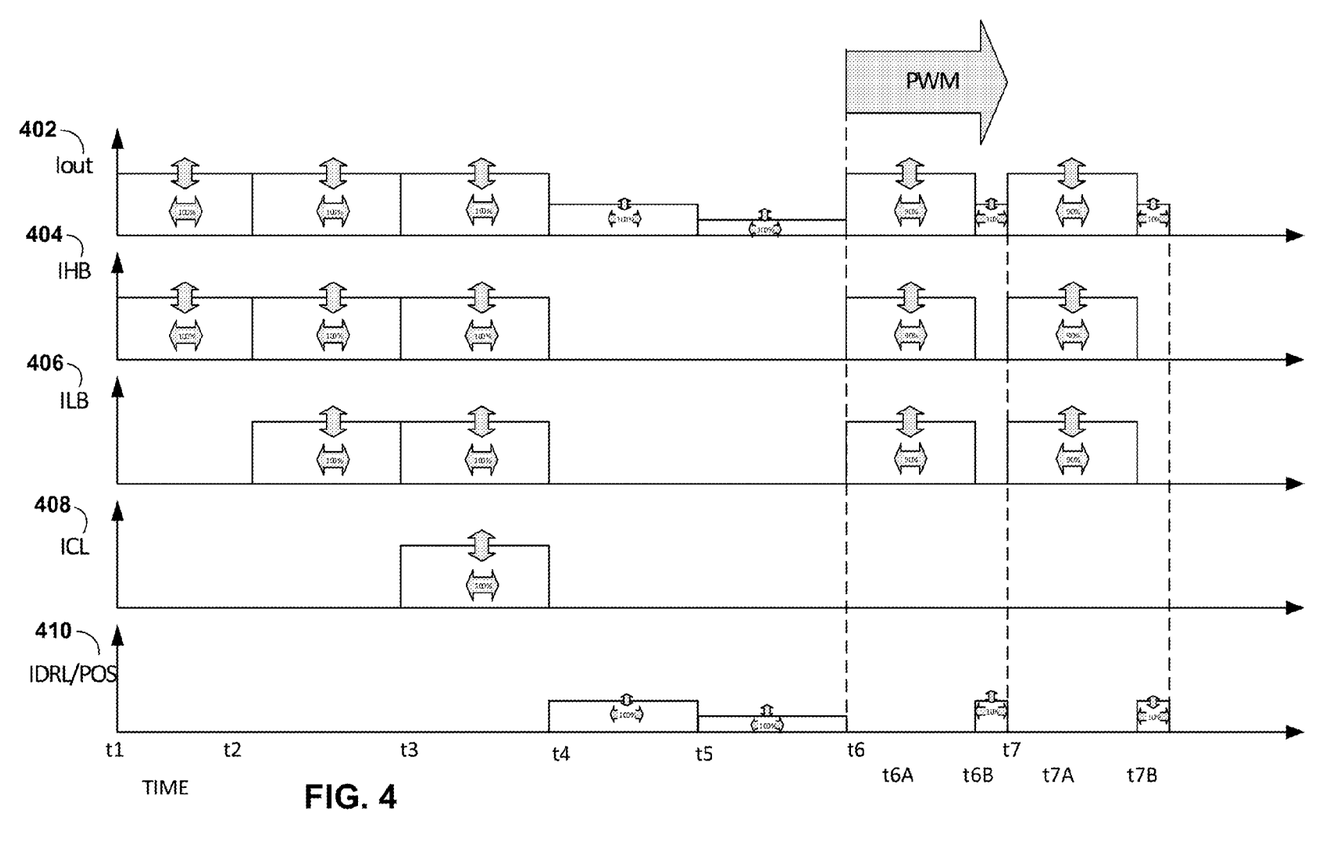
FIG. 4 is a timing diagram of the driver circuit of FIG. 2 according to the techniques of the disclosure.

FIG. 4 is a timing diagram of the driver circuit 100 of FIG. 2 according to the techniques of the disclosure. For convenience, FIG. 4 is described with respect to FIG. 2. However, FIG. 4 may equally apply to the operation of driver circuit 300 of FIG. 3.

With respect to FIG. 4, at time t1, controller 101 enables, via bypass switches 215A and 105B, LED branch 106B (e.g., the high-beams). As can be seen in FIG. 4, buck-boost converter 104 outputs a constant current $I_{out}$ 402, which, when converted by digital modulation circuit 210 into a first digitally modulated current 202A, is equal to the current flowing through LED branch 106B, $I_{HB}$ 404. At time t2, controller 101 enables, via bypass switches 215A and 105A-105B, LED branch 106A (e.g, the low beams) and LED branch 106B (e.g., the high beams). Buck-boost converter 104 outputs a constant current $I_{out}$ 402, which, when converted by digital modulation circuit 210 into a first digitally modulated current 202A, is equal to the current flowing through LED branch 106A, LB 406 and the current flowing through LED branch 106B, $I_{HB}$ 404. At time t3, controller 101 enables, via bypass switches 215A and 105A-105C, LED branch 106A (e.g, the low beams), LED branch 106B (e.g., the high beams), and LED branch 106C (e.g., the corner lights). Buck-boost converter 104 outputs a constant current $I_{out}$ 402, which, when converted by digital modulation circuit 210 into a first digitally modulated current 202A, is equal to the current flowing through LED branch 106A, LB 406, the current flowing through LED branch 106B, $I_{HB}$ 404, and the current flowing through LED branch 106C, $I_{CL}$ 408.

At time t4, controller 101 disables, via bypass switches 215A and 105A-105C, LED branch 106A (e.g, the low beams), LED branch 106B (e.g., the high beams), and LED branch 106C (e.g., the corner lights) while enabling, via bypass switches 215B and 205A-205B, both LED branch 206A (e.g., the DRL lights) and LED branch 206B (e.g., the positioning lights). Because digital modulation circuit 210 digitally modulates the output current of buck-boost converter 104 to supply LED branches 206 with a modulated current 202B, the average current flowing through LED branches 206, $I_{DRL/POS}$ 410, is much less than the amplitude of $I_{out}$. At time t5, controller 101 enables, via bypass switches 215B and 205A, LED branch 206A (e.g., the DRL lights), while disabling, via bypass switch 205B, LED branch 206B (e.g., the positioning lights). It may be seen that digital modulation circuit 210 digitally modulates the output current of buck-boost converter 104 to further reduce the average current supplied to LED branches 206, $I_{DRL/POS}$ 410.

At time t6, controller 101 enables, via bypass switches 106A-106B and 206A-206B, LED branch 106A (e.g, the low beams), LED branch 106B (e.g., the high beams), LED branch 206A (e.g., the DRL lights), and LED branch 206B (e.g., the positioning lights), while disabling, via bypass switches 106C, LED branch 106C (e.g., the corner lights). Because branches from both LED branches 106 and LED branches 206 are active, driver circuit 200 alternates between operating in the first period and the second period. For example, during time t6A, driver circuit 200 operates according to the first period such that controller 101, by enabling bypass switch 215A and disabling bypass switch 215B, causes buck-boost converter 104 and digital modulation circuit 210 to provide a first digitally modulated current 202A to LED branches 106A-106C. Similarly, during time t6B, driver circuit 200 operates according to the second period such that controller 101, by disabling bypass switch 215A and enabling bypass switch 215B, causes buck-boost converter 104 and digital modulation circuit 210 to provide a second digitally modulated current 202B to LED branches 206A-206B. At time t7, the cycle repeats. Again, during time t7A, driver circuit 200 operates according to the first period such that controller 101, by enabling bypass switch 215A and disabling bypass switch 215B, causes buck-boost converter 104 and digital modulation circuit 210 to provide a first digitally modulated current 202A to LED branches 106A-106C, while during time t7B, driver circuit 200 operates according to the second period such that controller 101, by disabling bypass switch 215A and enabling bypass switch 215B, causes buck-boost converter 104 and digital modulation circuit 210 to provide a second digitally modulated current 202B to LED branches 206A-206B.

Accordingly, the driver circuit of the present disclosure is more efficient than other driver circuits because it uses only a single buck-boost converter. Further, the driver circuit described herein is less expensive than other driver circuits because it uses only a single power inductor to perform power transformation. Further, the driver circuit described herein is more flexible in operation because it may selectively activate multiple groups of LED branches having different current requirements such that any combination of branches may be activated at any given time, with the switching occurring without being visible to the operator of the vehicle.

The operation of driver circuit 200 illustrated in FIG. 4 is shown as an example. The techniques as set forth in this disclosure may be implemented in the example operation of FIG. 4, as well as other types of driver circuits not described specifically herein. Nothing in this disclosure should be construed so as to limit the techniques of this disclosure to the example architecture illustrated by FIG. 4.

Figure 5:
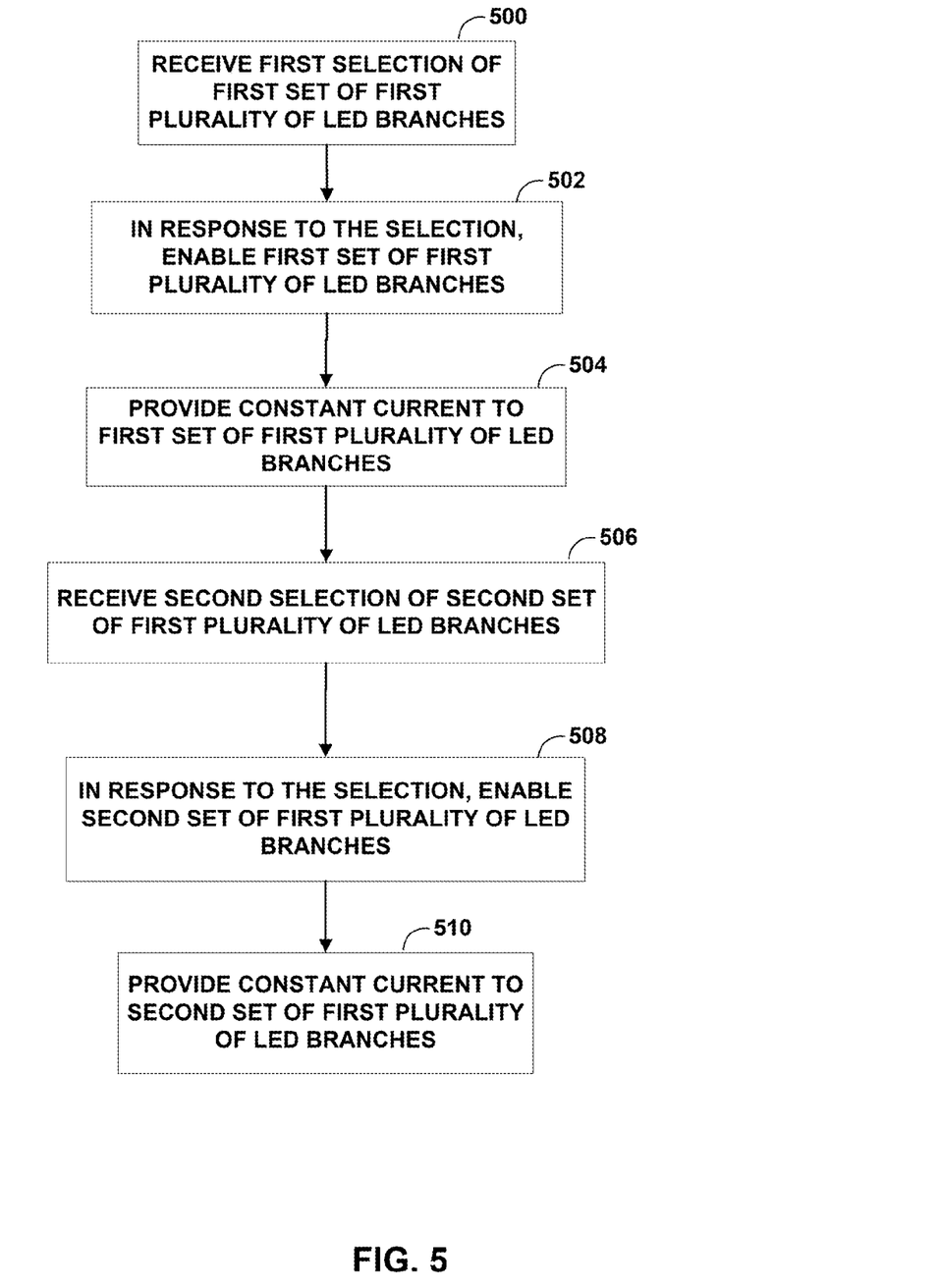
FIG. 5 is a flowchart illustrating an example operation of the driver circuit of FIG. 1 in accordance with the techniques of the disclosure.

FIG. 5 is a flowchart illustrating an example operation of the driver circuit of FIG. 1 in accordance with the techniques of the disclosure. In the example of FIG. 5, LED branch 106A comprises a string of LEDs operating at 16 V and 1.4 A to provide low-beam functionality for a vehicle, LED branch 106B comprises a string of LEDs operating at 20V and 1.4 A to provide high-beam functionality for the vehicle, and LED branch 106C comprises a string of LEDs operating at 16 V and 1.4 A to provide corner-light functionality for a vehicle.

Bypass switches 105 receive, from controller 101, a first selection of a first set of a first plurality of LED branches 106 (500). For example, bypass switch 105A receives an instruction from controller 101 to enable LED branch 106A, while bypass switches 105B-105C receive instructions to disable LED branches 106B-106C. In response to the instructions, bypass switches 105 selectively enable the first set of the first plurality of LED branches 106 (502). In the foregoing example, in response to the instructions from controller 101, bypass switch 105A enables LED branch 106A, while bypass switches 105B-105C disable LED branches 106B-106C. Furthermore, buck-boost converter 104, in response to instructions from controller 101, outputs a constant current, i.e. 1.4 A, and sufficient voltage to drive LED branch 106A, i.e. 16 V (504).

Subsequently, bypass switches 105 receive, from controller 101, a second selection of a second set of a first plurality of LED branches 106 (506). For example, bypass switch 105A receives an instruction from controller 101 to disable LED branch 106A, while bypass switches 105B-105C receive instructions to enable LED branches 106B-106C. In response to the instructions, bypass switches 105 selectively enable the second set of the first plurality of LED branches 106 (508). In the foregoing example, in response to the instructions from controller 101, bypass switch 105A disables LED branch 106A, while bypass switches 105B-105C enable LED branches 106B-106C. Furthermore, buck-boost converter 104, in response to instructions from controller 101, outputs a constant current, i.e. 1.4 A, and sufficient voltage to drive LED branch 106A, i.e. 36 V (510).

Accordingly, the driver circuit of the present disclosure is more efficient than other driver circuits because it uses only a single buck-boost converter. Further, the driver circuit described herein is less expensive than other driver circuits because it uses only a single power inductor to perform power transformation. Further, the driver circuit described herein is more flexible in operation because it may selectively activate one or more of the branches of LEDs such that any combination of the branches may be activated at any given time.

The operation of driver circuit 100 illustrated in FIG. 5 is shown as an example. The techniques as set forth in this disclosure may be implemented in the example operation of FIG. 5, as well as other types of driver circuits not described specifically herein. Nothing in this disclosure should be construed so as to limit the techniques of this disclosure to the example architecture illustrated by FIG. 5.

Figure 6:
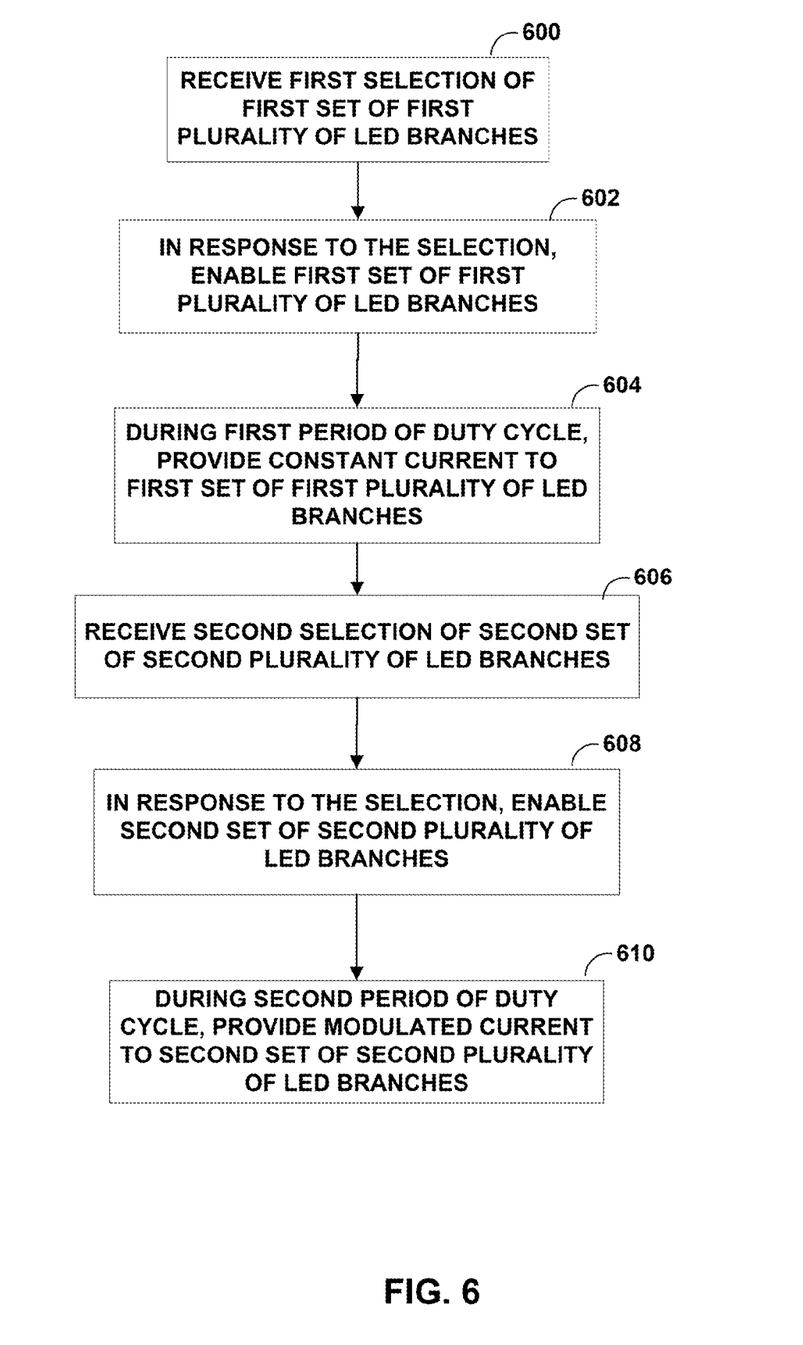
FIG. 6 is a flowchart illustrating an example operation of the driver circuit of FIG. 2 in accordance with the techniques of the disclosure.

FIG. 6 is a flowchart illustrating an example operation of the driver circuit of FIG. 2 in accordance with the techniques of the disclosure. For convenience, FIG. 6 is described with respect to FIG. 2. However, FIG. 6 may equally apply to the operation of driver circuit 300 of FIG. 3.

In the example of FIG. 6, LED branch 106A comprises a string of LEDs operating at 16 V and 1.4 A to provide low-beam functionality for a vehicle, LED branch 106B comprises a string of LEDs operating at 20V and 1.4 A to provide high-beam functionality for the vehicle, and LED branch 106C comprises a string of LEDs operating at 16 V and 1.4 A to provide corner-light functionality for a vehicle. Similarly, LED branch 206A comprises a string of LEDs operating at 50 V and 200 mA to provide DRL functionality for a vehicle, and LED branch 206B comprises a string of LEDs operating at 50 V and 200 mA to provide positioning light functionality for a vehicle.

During a first period of the duty cycle, bypass switches 215 and 105 receive, from controller 101, a first selection of a first set of a first plurality of LED branches 106 (600). For example, bypass switch 215A receives an instruction from controller 101 to enable the first plurality of LED branches 106 while bypass switch 215B receives an instruction from controller 101 to disable the second plurality of LED branches 206. Further, bypass switch 105A receives an instruction from controller 101 to enable LED branch 106A, while bypass switches 105B-105C receive instructions to disable LED branches 106B-106C. In response to the instructions, the bypass switches 215 and 105 selectively enable the first set of the first plurality of LED branches 106 (602). In the foregoing example, in response to the instructions from controller 101, bypass switches 215A and 105A enable LED branch 106A, while bypass switches 105B-105C disable LED branches 106B-106C. Furthermore, during the first period of the duty cycle, buck-boost converter 104, in response to instructions from controller 101, outputs a constant current, i.e. 1.4 A, and sufficient voltage to drive LED branch 106A, i.e. 16 V (604). Digital modulation circuit 210 digitally modulates the constant current to provide a first modulated current 202A to the first set of the second plurality of LED branches 106.

During a second period of the duty cycle, bypass switches 215 and 205 receive, from controller 101, a second selection of a second set of a second plurality of LED branches 206 (606). For example, For example, bypass switch 215A receives an instruction from controller 101 to disable the first plurality of LED branches 106 while bypass switch 215B receives an instruction from controller 101 to enable the second plurality of LED branches 206. Further, bypass switch 205A receives an instruction from controller 101 to enable LED branch 206A, while bypass switch 205B receives instructions to disable LED branch 206B. In response to the instructions, bypass switches 215 and 205 selectively enable the second set of the second plurality of LED branches 206 (608). In the foregoing example, in response to the instructions from controller 101, bypass switches 215B and 205A enable LED branch 206A, while bypass switch 205B disables LED branch 206B. Furthermore, during the second period of the duty cycle, buck-boost converter 104, in response to instructions from controller 101, outputs a constant current, i.e. 1.4 A, and sufficient voltage to drive LED branch 206A, i.e. 50 V. Digital modulation circuit 210 digitally modulates the constant current to provide a second modulated current 202B to the second set of the second plurality of LED branches 206 (610). In the foregoing example, digital modulation circuit 210 provides a modulated current having an average current of 200 mA to LED branch 206A.

Accordingly, the driver circuit of the present disclosure is more efficient than other driver circuits because it uses only a single buck-boost converter. Further, the driver circuit described herein is less expensive than other driver circuits because it uses only a single power inductor to perform power transformation. Further, the driver circuit described herein is more flexible in operation because it may selectively activate multiple groups of LED branches having different current requirements such that any combination of branches may be activated at any given time, with the switching occurring without being visible to the operator of the vehicle.

The operation of driver circuit 200 illustrated in FIG. 6 is shown as an example. The techniques as set forth in this disclosure may be implemented in the example operation of FIG. 6, as well as other types of driver circuits not described specifically herein. Nothing in this disclosure should be construed so as to limit the techniques of this disclosure to the example architecture illustrated by FIG. 6.

The following examples may illustrate one or more aspects of the disclosure.

Example 1

A method comprising: receiving, by a light-emitting diode (LED) driver circuit, a first selection of a first set of a plurality of branches of LEDs, wherein each of the plurality of branches is configured to be connected in series to one another and to a buck-boost converter, and wherein the buck-boost converter is configured to output a constant current at an adjustable output voltage; in response to receiving the first selection: selecting, by the LED driver circuit and via a plurality of bypass switches, the first set of the plurality of branches of LEDs corresponding to the first selection; providing, by the LED driver circuit, the constant current to the first set of the plurality of branches of LEDs; receiving, by the LED driver circuit, a second selection of a second set of the plurality of branches of LEDs, wherein the second selection includes at least one branch of the plurality of branches of LEDs that is not in the first selection; and in response to receiving the second selection: selecting, by the LED driver circuit and via the plurality of bypass switches, the second set of the plurality of branches of LEDs corresponding to the second selection; and providing, by the LED driver circuit, the constant current to the second set of the plurality of branches of LEDs.

Example 2

The method of example 1, further comprising: during a first period of a cycle, providing, by the LED driver circuit, the constant current to the selected set of the first and second set of the plurality of branches of LEDs; and during a second period of the cycle, providing, by the LED driver circuit and according to a digital duty cycle, a digitally modulated current to a second plurality of branches of LEDs.

Example 3

The method of example 2, wherein the digitally modulated current is modulated according to one of pulse-width modulation, pulse-duration modulation, and pulse-density modulation.

Example 4

The method according to any of examples 1-3, wherein the buck-boost converter comprises an active-output voltage discharge buck-boost converter.

Example 5

The method according to any of examples 1-4, wherein a vehicle headlight system comprises the plurality of branches of LEDs.

Example 6

The method of example 5, wherein the plurality of branches of LEDs comprises: a first branch of LEDs configured to operate as a high-beam headlight system of the vehicle headlight system; a second branch of LEDs configured to operate as a low-beam headlight system of the vehicle headlight system; and a third branch of LEDs configured to operate as a corner light system of the vehicle headlight system.

Example 7

The method according to any of examples 2-3, wherein the second plurality of branches of LEDs comprises: a fourth branch of LEDs configured to operate as a daytime running light system of a vehicle headlight system; and a fifth branch of LEDs configured to operate as a positioning light system of the vehicle headlight system.

Example 8

A light-emitting diode (LED) driver circuit, configured to: receive a first selection of a first set of a plurality of branches of LEDs, wherein each of the plurality of branches is configured to be connected in series to one another and to a buck-boost converter, and wherein the buck-boost converter is configured to output a constant current at an adjustable output voltage; in response to receiving the first selection: select, via a plurality of bypass switches, the first set of the plurality of branches of LEDs corresponding to the first selection; provide the constant current to the first set of the plurality of branches of LEDs; receive a second selection of a second set of the plurality of branches of LEDs, wherein the second selection includes at least one branch of the plurality of branches of LEDs that is not in the first selection; and in response to receiving the second selection: select, via the plurality of bypass switches, the second set of the plurality of branches of LEDs corresponding to the second selection; and provide the constant current to the second set of the plurality of branches of LEDs.

Example 9

The LED driver circuit of example 8, wherein the LED driver circuit is further configured to: during a first period of a cycle, provide the constant current to the selected set of the first and second set of the plurality of branches of LEDs; and during a second period of the cycle, provide, according to a digital duty cycle, a digitally modulated current to a second plurality of branches of LEDs.

Example 10

The LED driver circuit of example 9, wherein the digitally modulated current is modulated according to one of pulse-width modulation, pulse-duration modulation, and pulse-density modulation.

Example 11

The LED driver circuit according to any of examples 1-3, wherein the buck-boost converter comprises an active-output voltage discharge buck-boost converter.

Example 12

The LED driver circuit according to any of examples 1-4, wherein a vehicle headlight system comprises the plurality of branches of LEDs.

Example 13

The LED driver circuit of example 12, wherein the plurality of branches of LEDs comprises: a first branch of LEDs configured to operate as a high-beam headlight system of the vehicle headlight system; a second branch of LEDs configured to operate as a low-beam headlight system of the vehicle headlight system; and a third branch of LEDs configured to operate as a corner light system of the vehicle headlight system.

Example 14

The LED driver circuit according to any of examples 9-10, wherein the second plurality of branches of LEDs comprises: a fourth branch of LEDs configured to operate as a daytime running light system of a vehicle headlight system; and a fifth branch of LEDs configured to operate as a positioning light system of the vehicle headlight system.

Example 15

A system comprising: a buck-boost converter configured to output a constant current at an adjustable output voltage; a light-emitting diode (LED) driver circuit, configured to: receive a first selection of a first set of a plurality of branches of LEDs, wherein each of the plurality of branches is configured to be connected in series to one another and to the buck-boost converter; in response to receiving the first selection: select, via a plurality of bypass switches, the first set of the plurality of branches of LEDs corresponding to the first selection; provide the constant current to the first set of the plurality of branches of LEDs; receive a second selection of a second set of the plurality of branches of LEDs, wherein the second selection includes at least one branch of the plurality of branches of LEDs that is not in the first selection; and in response to receiving the second selection: select, via the plurality of bypass switches, the second set of the plurality of branches of LEDs corresponding to the second selection; and provide the constant current to the second set of the plurality of branches of LEDs; and the plurality of branches of LEDs.

Example 16

The system of example 15, wherein the LED driver circuit is further configured to: during a first period of a cycle, provide the constant current to the selected set of the first and second set of the plurality of branches of LEDs; and during a second period of the cycle, provide, according to a digital duty cycle, a digitally modulated current to a second plurality of branches of LEDs.

Example 17

The system according to any of examples 15-16, wherein the buck-boost converter comprises an active-output voltage discharge buck-boost converter.

Example 18

The system according to any of examples 15-17, wherein a vehicle headlight system comprises the plurality of branches of LEDs.

Example 19

The system of example 18, wherein the plurality of branches of LEDs comprises: a first branch of LEDs configured to operate as a high-beam headlight system of the vehicle headlight system; a second branch of LEDs configured to operate as a low-beam headlight system of the vehicle headlight system; and a third branch of LEDs configured to operate as a corner light system of the vehicle headlight system.

Example 20

The system according to any of examples 15-19, wherein the second plurality of branches of LEDs comprises: a fourth branch of LEDs configured to operate as a daytime running light system of a vehicle headlight system; and a fifth branch of LEDs configured to operate as a positioning light system of the vehicle headlight system.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

Various examples have been described. These and other examples are within the scope of the following claims.

What is claimed is:

1. A method comprising:
receiving, by a light-emitting diode (LED) driver circuit, a first selection of a first set of a plurality of sets of branches of LEDs, wherein each set of the plurality of sets of branches of LEDs is configured to be connected in parallel to one another and to a buck-boost converter, wherein the buck-boost converter is configured to output a constant current at an adjustable output voltage, and wherein the first set of the plurality of sets of branches of LEDs excludes at least one set of branches of LEDs of the plurality of sets of branches of LEDs;

receiving, by the LED driver circuit, a second selection of a subset of the first set of the plurality of sets of branches of LEDs, wherein the subset of the first set of the plurality of sets of branches of LEDs excludes at least one LED branch of the first set, and wherein the selected subset of the first set of the plurality of sets of branches of LEDs is independently operable from the excluded at least one LED branch of the first set;

in response to receiving the first selection and the second selection:
selecting, by the LED driver circuit and via a plurality of bypass switches, the subset of the first set of the plurality of sets of branches of LEDs corresponding to the first selection and second selection; and
providing, by the LED driver circuit, the constant current to only the subset of the first set of the plurality of sets of branches of LEDs.

2. The method of claim 1, further comprising:
during a first period of a cycle, providing, by the LED driver circuit, the constant current to the selected subset of the first set of the plurality of sets of branches of LEDs; and
during a second period of the cycle:
digitally modulating the constant current into a digitally modulated current; and
providing, by the LED driver circuit and according to a digital duty cycle, the digitally modulated current to a second set of the plurality of sets of branches of LEDs.

3. The method of claim 2, wherein the digitally modulated current is modulated according to one of pulse-duration modulation or pulse-density modulation.

4. The method of claim 2, wherein the second set of the plurality of sets of branches of LEDs comprises:
a fourth branch of LEDs configured to operate as a daytime running light system of a vehicle headlight system; and
a fifth branch of LEDs configured to operate as a positioning light system of the vehicle headlight system.

5. The method of claim 2,
wherein the constant current comprises a peak amplitude, and
wherein the digitally modulated current comprises:
a peak amplitude approximately equal to the peak amplitude of the constant current, and
an average amplitude that is less than the peak amplitude of the constant current.

6. The method of claim 1, wherein the buck-boost converter comprises an active-output voltage discharge buck-boost converter.

7. The method of claim 1, wherein a vehicle headlight system comprises the plurality of sets of branches of LEDs.

8. The method of claim 7, wherein the first set of the plurality of sets of branches of LEDs comprises:
a first branch of LEDs configured to operate as a high-beam headlight system of the vehicle headlight system;
a second branch of LEDs configured to operate as a low-beam headlight system of the vehicle headlight system; and
a third branch of LEDs configured to operate as a corner light system of the vehicle headlight system.

9. A light-emitting diode (LED) driver circuit, configured to:
receive a first selection of a first set of a plurality of sets of branches of LEDs, wherein each set of the plurality of sets of branches is configured to be connected in parallel to one another and to a buck-boost converter, wherein the buck-boost converter is configured to output a constant current at an adjustable output voltage, and wherein the first set of the plurality of sets of branches of LEDs excludes at least one set of branches of LEDs of the plurality of sets of branches of LEDs, and wherein the selected subset of the first set of the plurality of sets of branches of LEDs is independently operable from the excluded at least one LED branch of the first set;
receive a second selection of a subset of the first set of the plurality of sets of branches of LEDs, wherein the subset of the first set of the plurality of sets of branches of LEDs excludes at least one LED branch of the first set;
in response to receiving the first selection and the second selection:
select, via a plurality of bypass switches, the subset of the first set of the plurality of sets of branches of LEDs corresponding to the first selection and the second selection; and
provide the constant current to only the subset of the first set of the plurality of sets of branches of LEDs.

10. The LED driver circuit of claim 9, wherein the LED driver circuit is further configured to:
during a first period of a cycle, provide the constant current to the selected subset of the first set of the plurality of sets of branches of LEDs; and
during a second period of the cycle:
digitally modulate the constant current into a digitally modulated current; and
provide, according to a digital duty cycle, the digitally modulated current to a second set of the plurality of sets of branches of LEDs.

11. The LED driver circuit of claim 10, wherein the digitally modulated current is modulated according to one of pulse-duration modulation or pulse-density modulation.

12. The LED driver circuit of claim 10, wherein the second set of the plurality of sets of branches of LEDs comprises:
a fourth branch of LEDs configured to operate as a daytime running light system of a vehicle headlight system; and
a fifth branch of LEDs configured to operate as a positioning light system of the vehicle headlight system.

13. The LED driver circuit of claim 9, wherein the buck-boost converter comprises an active-output voltage discharge buck-boost converter.

14. The LED driver circuit of claim 9, wherein a vehicle headlight system comprises the plurality of sets of branches of LEDs.

15. The LED driver circuit of claim 14, wherein the first set of the plurality of sets of branches of LEDs comprises:
a first branch of LEDs configured to operate as a high-beam headlight system of the vehicle headlight system;
a second branch of LEDs configured to operate as a low-beam headlight system of the vehicle headlight system; and
a third branch of LEDs configured to operate as a corner light system of the vehicle headlight system.

16. A system comprising:
a buck-boost converter configured to output a constant current at an adjustable output voltage;
a light-emitting diode (LED) driver circuit, configured to:
receive a first selection of a first set of a plurality of sets of branches of LEDs, wherein each set of the plurality of sets of branches is configured to be connected in parallel to one another and to the buck-boost converter and wherein the first set of the plurality of sets of branches of LEDs excludes at least one set of branches of LEDs of the plurality of sets of branches of LEDs;

receive a second selection of a subset of the first set of the plurality of sets of branches of LEDs, wherein the subset of the first set of the plurality of sets of branches of LEDs excludes at least one LED branch of the first set, and wherein the selected subset of the first set of the plurality of sets of branches of LEDs is independently operable from the excluded at least one LED branch of the first set:

in response to receiving the first selection and the second selection:

select, via a plurality of bypass switches, the subset of the first set of the plurality of sets of branches of LEDs corresponding to the first selection and the second selection; and provide the constant current to only the subset of the first set of the plurality of sets of branches of LEDs.

17. The system of claim 16, wherein the LED driver circuit is further configured to:

during a first period of a cycle, provide the constant current to the selected subset of the first set of the plurality of sets of branches of LEDs; and during a second period of the cycle:

digitally modulate the constant current into a digitally modulated current; and provide according to a digital duty cycle, the digitally modulated current to a second set of the plurality of sets of branches of LEDs.

18. The system of claim 17, wherein the second set of the plurality of sets of branches of LEDs comprises:

a fourth branch of LEDs configured to operate as a daytime running light system of a vehicle headlight system; and a fifth branch of LEDs configured to operate as a positioning light system of the vehicle headlight system.

19. The system of claim 16, wherein the buck-boost converter comprises an active-output voltage discharge buck-boost converter.

20. The system of claim 16, wherein a vehicle headlight system comprises the plurality of branches of LEDs.

21. The system of claim 20, wherein the first set of the plurality of sets of branches of LEDs comprises:

a first branch of LEDs configured to operate as a high-beam headlight system of the vehicle headlight system;

a second branch of LEDs configured to operate as a low-beam headlight system of the vehicle headlight system; and a third branch of LEDs configured to operate as a corner light system of the vehicle headlight system.

* * * * *